June 21, 1955     E. L. SALFELDER     2,711,022
PERSPECTIVE DEMONSTRATOR
Filed Oct. 7, 1952     2 Sheets-Sheet 1
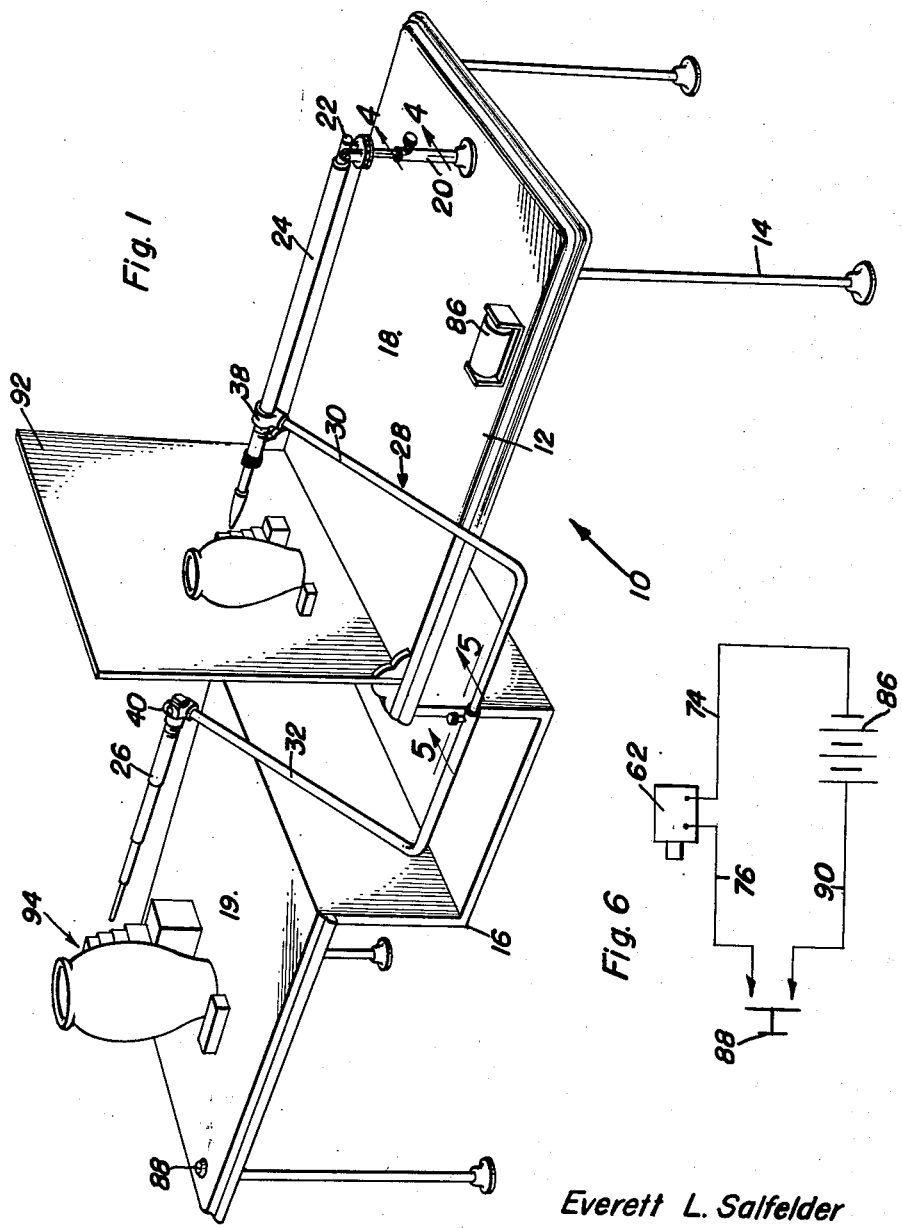
Everett L. Salfelder
INVENTOR.

June 21, 1955 — E. L. SALFELDER — 2,711,022
PERSPECTIVE DEMONSTRATOR
Filed Oct. 7, 1952 — 2 Sheets-Sheet 2
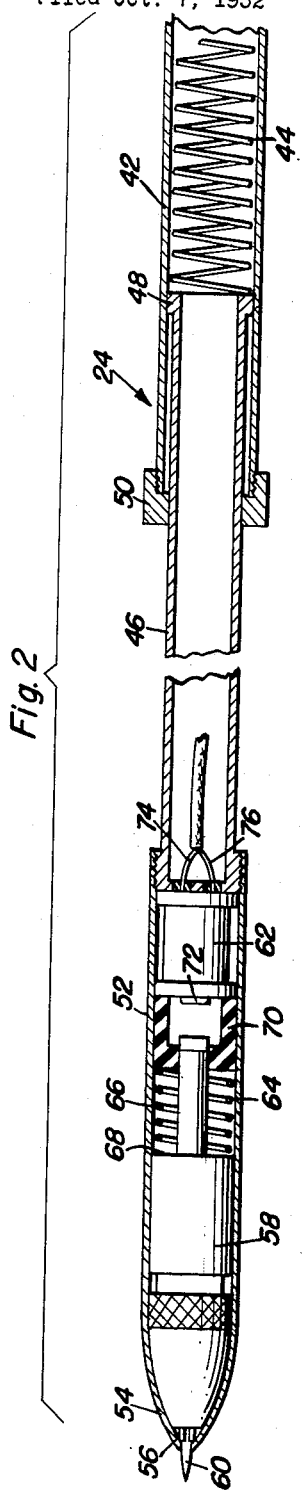
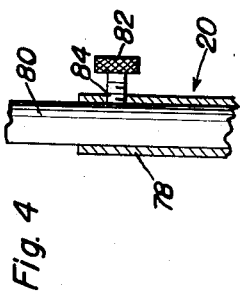
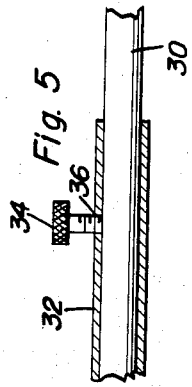
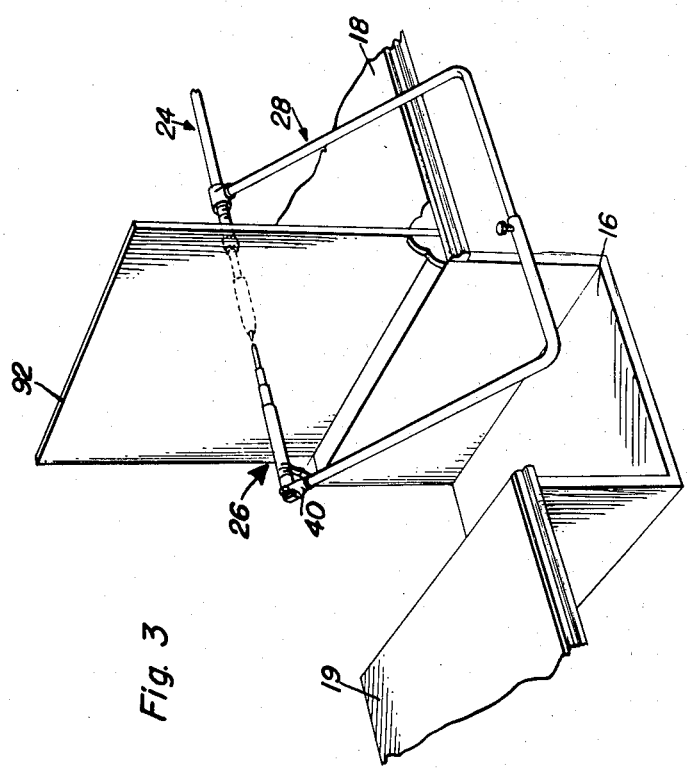
Everett L. Salfelder
INVENTOR.

United States Patent Office 2,711,022
Patented June 21, 1955

2,711,022

PERSPECTIVE DEMONSTRATOR

Everett L. Salfelder, Staten Island, N. Y.

Application October 7, 1952, Serial No. 313,424

2 Claims. (Cl. 33—18)

The present invention relates to an instrument for demonstrating perspective and more particularly relates to an instrument that is specifically adapted to aid in the representation on a plane, or curved surface objects or animals as they appear to the eye.

A primary object of the invention is to provide an instrument or device of the above character that is particularly designed and constructed to be utilized for the teaching of the principles of perspective to art students and as an aid for self help in understanding how to apply these principles.

Another object, ancillary to the preceding object, is to provide an instrument for commercial usage for accurately reproducing on a plane or curved surface a natural object or animal in its true perspective.

Yet another object of the invention is to provide an instrument of the above character that includes an extensible and retractable drawing tip that is operated by an electro-magnet.

Still another object of the invention is to provide a perspective demonstrating instrument or device that is capable of a wide range of application, that is economical of manufacture and that requires a minimum of skill to understand and operate.

These, together with various ancillary objects and features which will later become apparent as the following description proceeds are attained by this invention, a preferred embodiment of which is shown by way of example only in the accompanying drawings, wherein:

Figure 1 is a perspective view of the perspective demonstrating device in its entirety;

Figure 2 is a side elevational view in cross-section of a portion of one of the members of the demonstrating device;

Figure 3 is a perspective view of a portion of the device disclosing another position of the same;

Figure 4 is a sectional view taken substantially along section line 4—4 of Figure 1 showing the adjusting means for the extensible standard of the device;

Figure 5 is a sectional view taken substantially along section 5—5 showing the adjustable means for the extensible yoke which forms a part of the device; and Figure 6 is a diagrammatic showing of the electro-magnet circuit for the extensible and retractable drawing tip of the device.

Referring now to the accompanying drawings in detail, wherein like reference numerals are utilized to designate similar parts throughout the various views the numeral 10 designates the perspective demonstrating device in its entirety.

The device comprises generally a flat base 12 in the form of a table supported at its ends by legs 14 and having a depressed central portion 16. As will be noted, the flat base 12 includes first and second end portions 18 and 19 connected to one another by means of the depressed central section 16. Mounted at the end of the first end section 18 is a vertically extensible standard 20 to the upper end of which is swivelly secured as at 22 a first elongated tubular member 24, which member overlies the section 18 of the base 12. Longitudinally aligned with the first member 24 and spaced therefrom to overlie the second section 20 of the base 12 is a second, elongated, tubular member 26. A yoke 28 securely interconnects the first and second elongated members 24 and 26 to one another to maintain the correct spacing between these members.

As will be noted, the yoke 28 is substantially U-shaped and comprises first and second L-shaped tubular members 30 and 32, respectively, which telescope within one another to vary the spacing between the members 24 and 26 as desired. As will be noted particularly in Figure 5, the aligned legs of the L-shaped members forming the web of the U-shaped yoke are longitudinally extensible with respect to one another whereby the distance between the parallel leg portions of the L-shaped members and consequently the spacing between the members 24 and 26 may be varied. Set screw 34 threaded through aperture 36 in the lower leg portion of L-shaped member 32 secures the yoke 28 in selected adjusted positions.

The elongated tubular member 24, which may be considered the drawing rod is rigidly secured to the L-shaped member 30 of the yoke 28 by means of the sleeve fitting 38 while the elongated member 26, which may be considered the guide or tracing rod is secured to the L-shaped member 32 for swinging movement about 180° arc by means of the fiting 40. The guide rod 26 is comprised of a plurality of telescoping sections which may be extended and retracted in any suitable manner.

Referring particularly to Figure 2, the construction of the drawing member or rod 24 will be clearly observed. The member 24 consists of a first tubular section 42 within which a coil spring 44 is disposed. A second section 46, also of tubular construction, telescopingly slides within the section 42 and has one of its ends abutting an end of the coil spring 44 to continually urge the tubular section 46 to extended position. To prevent complete withdrawal of the section 46 from the section 42, the end of the section 46 disposed within the section 42 is provided with an annular flange 48 therearound which contacts the inner surface of the tube 42 while the inner end of the tube 42 is provided with a cap 50 which the flange 48 abuts when the section 46 is in its fully extended position. At the end of the section 46 disposed exteriorly of the tube 42 is a tubular casing 52 having a conically tapered outer end 54 terminating in the tip opening 56. Disposed within the tubular casing 52 is the extensible and retractable drawing tip 58 having a drawing portion or point 60 extending through the aperture 56. Also mounted within the casing 52 is the electro-magnet 62 for retracting the drawing tip 58 and a coil spring 64 for extending the drawing tip 58.

As shown, the rearward end of the drawing tip 58 terminates in a rod 66 of reduced cross section to provide an annular shoulder 68 between the ends of the drawing tip and upon which one end of the coil spring 64 may seat. The end of the reduced rod portion 66 extends slidably into a spacing sleeve 70 of insulating material against which the other end of the coil spring 64 seats. The core 72 of the electro-magnet 62 opens into this sleeve 70 longitudinally aligned with and spaced from the free end of the reduced rod portion 66. As shown in Figure 2, the electro-magnet 62 is not energized and the drawing point 60 is extended through the aperture 56. Upon energization of the electro magnet 62 through the conductors 74 and 76, the drawing tip 58 is drawn to a position whereby the reduced end portion 66 abuts the end of the core 72 of the electro-magnet whereby the drawing point 60 is retracted through the opening 56.

As shown in the enlarged sectional view of a portion of the standard 20 in Figure 4, this standard comprises an upright tubular section 78 in which is slidably disposed a vertically extensible rod 80 whereby the drawing rod 24 and the tracing rod 26 with their connecting yoke 28 may be raised or lowered with respect to the flat base 12. Thumb screw 82 threaded through aperture 84 in the tubular section 78 secures the extensible rod 80 in its selected extensible positions.

Referring now to Figures 1 and 6, the means for operating the electro-magnet will be clearly observed. On the flat section 18 is mounted a dry cell 86 or other electric current producing device and on the flat section 19 is mounted a push-button 88. Conductor 74 leads from one terminal of the battery or dry cell 86 to the electro-magnet 62 while conductor 76 leads from the electro-magnet 62 to the push-button switch 88. A third conductor 90 leads from the other terminal of the battery 86 to the push-button switch 88 whereby upon depression of the push-button, the circuit is completed and the electro-magnet 62 is energized.

Referring particularly to Figures 1 and 3, the operation of the device will be clearly apparent. A picture plan surface 92 is disposed on the flat surface 18 adjacent the central depression 16 and the spring 44 continually urges the tapered end of the casing 52 into contact with the surface of the picture plan. The U-shaped yoke 28 embraces, or partially so, the picture plan 92 and the tip of the guide rod 26 touches a series of natural objects illustrated by the numeral 94 placed on the flat surface 20. By virtue of the longitudinal alignment of the members 24 and 26, and the swivel attachment of the swivel 24 to the standard 20, by tracing the point of the guide rod 26 along the contours of the natural objects 94, the tip 54 of the tubular casing 52 will be guided on the picture plan surface 92. When it is desired that any particular portion of the objects 94 are to be reproduced on the picture plan surface 92 to show the proper perspective of these contours on the plane surface, the drawing point 60 is allowed to project through the aperture 56 in the tip of the casing 52. However, when it is not desired that the movement of the member 26 be imparted by means of lines to the plane surface 92, the push-button 88 is depressed actuating the electro-magnet 62 and retracting the point 60 within the casing 62. By this arrangement, it is quite simple to trace the major outline of a natural object or objects mounted on the flat base 12 of the device to aid in the successful representation of such natural objects on the plane surface 92.

When, for any reason it is necessary that the tracing tip of the number 26 be disposed on the opposite surface of the picture plan 92, the same may be simply swung about its pivot 40 to achieve the position shown in Figure 3 of the drawings.

From the above explanation, the construction and operation of the device are believed to be readily understood. However, since numerous modifications and changes will occur to those skilled in the art after a consideration of the foregoing specification taken in conjunction with the accompanying drawings, it is not desired to limit the invention to the exact construction shown and described. But, all suitable modifications may be resorted to which fall within the scope of the appended claims.

Having described the invention, what is claimed as new is:

1. In a device for demonstrating perspective, a tubular drawing member including an extensible section, having a conically tapered outer end terminating in an end opening, a drawing tip disposed within said casing and having a portion thereof conforming to the shape of the casing outer end, a drawing point on said tip projecting through said opening, a rod like extension of reduced cross-section projecting rearwardly from said tip, and being spaced concentrically within the casing, a collar surrounding said extension and frictionally engaging the inner surface of said casing, resilient means surrounding said rod like extension and urging the drawing tip toward the outer end of the casing, and electro-magnetic means in said casing for pulling the drawing tip in opposition to the action of the resilient means.

2. In a device for demonstrating perspective, a tubular drawing member having a tapered outer end terminating in an end opening, a drawing tip disposed within said casing and having a portion thereof conforming to the shape of the casing outer end, a drawing point in said tip projecting through said opening, a rod-like extension of reduced cross-section projecting rearwardly from said tip, a collar surrounding said extension and frictionally engaging the inner surface of said casing, resilient means surrounding said rod-like extension and urging the drawing tip toward the outer end of the casing, and electrical means within said casing for withdrawing the drawing tip in opposition to the spring, and switch means disposed remote from said tip and operatively connected to said electrical means for energizing the same.

References Cited in the file of this patent

UNITED STATES PATENTS

| Number | Name | Date |
|---|---|---|
| 190,797 | Ware | May 15, 1877 |
| 366,987 | Westlake | July 19, 1887 |
| 1,059,893 | Milde | Apr. 22, 1913 |
| 1,223,539 | Vandal | Apr. 24, 1917 |
| 1,746,331 | Aftergut et al. | Feb. 11, 1930 |
| 2,000,766 | Leofanti | May 7, 1935 |
| 2,419,610 | Waldorf | Apr. 29, 1947 |

FOREIGN PATENTS

| Number | Country | Date |
|---|---|---|
| 655,228 | Great Britain | July 11, 1951 |
| 19,736 | Holland | Apr. 15, 1929 |